（12) United States Patent
Hurst et al.

(10) Patent No.: US 7,793,096 B2
(45) Date of Patent: Sep. 7, 2010

(54) NETWORK ACCESS PROTECTION

(75) Inventors: Ryan M. Hurst, Woodinville, WA (US);
Ekta H. Manaktala, Redmond, WA
(US); Paul G. Mayfield, Sammamish,
WA (US); Vivek P. Kamath, San Diego,
CA (US)

(73) Assignee: Microsoft Corporation, Redmond, WA (US)

( * ) Notice: Subject to any disclaimer, the term of this patent is extended or adjusted under 35 U.S.C. 154(b) by 1145 days.

(21) Appl. No.: 11/395,559

(22) Filed: Mar. 31, 2006

(65) Prior Publication Data

US 2007/0234040 A1    Oct. 4, 2007

(51) Int. Cl.
*H04L 29/06*    (2006.01)
(52) U.S. Cl. .................. 713/156; 713/150; 713/155
(58) Field of Classification Search .................. 713/156, 713/155, 150
See application file for complete search history.

(56) References Cited

U.S. PATENT DOCUMENTS

| | | | |
|---|---|---|---|
| 5,659,616 A | 8/1997 | Sudia | |
| 6,023,586 A | 2/2000 | Gaisford et al. | |
| 6,088,451 A | 7/2000 | He et al. | |
| 6,134,680 A | 10/2000 | Yeomans | |
| 6,154,776 A | 11/2000 | Martin | |
| 6,233,577 B1 | 5/2001 | Ramasubramani | |
| 6,233,616 B1 | 5/2001 | Reid | |
| 6,275,941 B1 | 8/2001 | Saito et al. | |
| 6,301,613 B1 | 10/2001 | Ahlstrom et al. | |
| 6,321,339 B1 | 11/2001 | French | |
| 6,327,550 B1 | 12/2001 | Vinberg et al. | |
| 6,389,539 B1 | 5/2002 | Hamilton, II et al. | |
| 6,393,484 B1 | 5/2002 | Massarani | |
| 6,553,493 B1 | 4/2003 | Okumura | |
| 6,564,320 B1 | 5/2003 | De Silva | |
| 6,601,175 B1 | 7/2003 | Arnold et al. | |
| 6,611,869 B1 | 8/2003 | Eschelbeck | |
| 6,615,383 B1 | 9/2003 | Talluri et al. | |
| 6,754,664 B1 | 6/2004 | Bush | |
| 6,847,609 B1 | 1/2005 | Sarnikowski et al. | |

(Continued)

FOREIGN PATENT DOCUMENTS

WO    WO 2004/002062 A1    12/2003

(Continued)

OTHER PUBLICATIONS

Mark Hachman, InfoSect News, ISN Spec in Works to Secure Wireless Networks, May 10, 2004.*

(Continued)

*Primary Examiner*—David Y Jung
(74) *Attorney, Agent, or Firm*—Merchant & Gould P.C.

(57) ABSTRACT

A method is provided for use in a computer system including a client and a health registration authority. The health registration authority is configured to accept requests for assertions, and the client has a health state described by at least one health claim. The method may include an act of including an indication of the at least one health claim of the client in a request for an assertion. A second method is provided for use in a computer system comprising a client, an assertion authority, and a plurality of health policies. The method can include an act of including an indication of at least one health policy that the health claim of the client satisfies in an assertion.

5 Claims, 7 Drawing Sheets

U.S. PATENT DOCUMENTS

| | | |
|---|---|---|
| 6,854,056 B1 | 2/2005 | Benantar |
| 6,871,284 B2 | 3/2005 | Cooper et al. |
| 6,873,988 B2 | 3/2005 | Herrmann et al. |
| 6,892,317 B1 | 5/2005 | Sampath et al. |
| 6,993,686 B1 | 1/2006 | Groenendaal et al. |
| 7,020,532 B2 | 3/2006 | Johnson et al. |
| 7,032,022 B1 | 4/2006 | Shanumgam et al. |
| 7,039,807 B2 | 5/2006 | Spitz |
| 7,046,647 B2 | 5/2006 | Oba et al. |
| 2001/0047514 A1 | 11/2001 | Goto et al. |
| 2002/0010800 A1 | 1/2002 | Riley et al. |
| 2002/0073308 A1 | 6/2002 | Benantar |
| 2002/0078347 A1 | 6/2002 | Hericourt et al. |
| 2002/0129264 A1 | 9/2002 | Rowland et al. |
| 2002/0144108 A1 | 10/2002 | Benantar |
| 2002/0199116 A1 | 12/2002 | Hoene et al. |
| 2003/0009752 A1 | 1/2003 | Gupta |
| 2003/0014644 A1 | 1/2003 | Burns et al. |
| 2003/0041167 A1 | 2/2003 | French et al. |
| 2003/0044020 A1 | 3/2003 | Aboba et al. |
| 2003/0055962 A1 | 3/2003 | Freund et al. |
| 2003/0055994 A1 | 3/2003 | Herrmann et al. |
| 2003/0065919 A1 | 4/2003 | Albert et al. |
| 2003/0087629 A1 | 5/2003 | Juitt et al. |
| 2003/0097315 A1 | 5/2003 | Guerrero et al. |
| 2003/0126136 A1 | 7/2003 | Omoigui |
| 2003/0191966 A1 | 10/2003 | Gleichauf |
| 2003/0200464 A1 | 10/2003 | Kidron |
| 2003/0221002 A1 | 11/2003 | Srivastava et al. |
| 2004/0006532 A1 | 1/2004 | Lawrence et al. |
| 2004/0039580 A1 | 2/2004 | Steger |
| 2004/0083129 A1 | 4/2004 | Herz |
| 2004/0085944 A1 | 5/2004 | Boehm |
| 2004/0107360 A1 | 6/2004 | Herrmann et al. |
| 2004/0153171 A1 | 8/2004 | Brandt et al. |
| 2004/0153823 A1 | 8/2004 | Ansari |
| 2004/0167984 A1 | 8/2004 | Herrmann |
| 2004/0249974 A1 | 12/2004 | Alkhatib et al. |
| 2004/0250107 A1 | 12/2004 | Guo |
| 2004/0268148 A1 | 12/2004 | Karjala |
| 2005/0015622 A1 | 1/2005 | Williams et al. |
| 2005/0021733 A1 | 1/2005 | Clinton et al. |
| 2005/0021975 A1 | 1/2005 | Liu |
| 2005/0081111 A1 | 4/2005 | Morgan et al. |
| 2005/0086337 A1 | 4/2005 | Quittek et al. |
| 2005/0086502 A1 | 4/2005 | Rayes et al. |
| 2005/0114502 A1 | 5/2005 | Raden et al. |
| 2005/0131997 A1 | 6/2005 | Lewis et al. |
| 2005/0138204 A1 | 6/2005 | Iyer et al. |
| 2005/0144532 A1 | 6/2005 | Dombrowa et al. |
| 2005/0165953 A1 | 7/2005 | Oba et al. |
| 2005/0166197 A1 | 7/2005 | Riley |
| 2005/0172019 A1 | 8/2005 | Williamson et al. |
| 2005/0188285 A1 | 8/2005 | Fellenstein et al. |
| 2005/0193386 A1 | 9/2005 | McCaleb et al. |
| 2005/0198527 A1 | 9/2005 | Johnson et al. |
| 2005/0254651 A1 | 11/2005 | Porozni et al. |
| 2005/0256970 A1 | 11/2005 | Harrison et al. |
| 2005/0267954 A1 | 12/2005 | Lewis et al. |
| 2006/0002556 A1 | 1/2006 | Paul |
| 2006/0004772 A1 | 1/2006 | Hagan |
| 2006/0033606 A1 | 2/2006 | Howarth et al. |
| 2006/0036733 A1 | 2/2006 | Fujimoto et al. |
| 2006/0085850 A1 | 4/2006 | Mayfield et al. |
| 2006/0143440 A1 | 6/2006 | Ponnapalli et al. |
| 2006/0164199 A1 | 7/2006 | Gilde et al. |
| 2007/0100850 A1 | 5/2007 | Choe et al. |
| 2007/0127500 A1 | 6/2007 | Maeng |
| 2007/0143392 A1 | 6/2007 | Choe et al. |
| 2007/0150934 A1 | 6/2007 | Fiszman et al. |
| 2007/0198525 A1 | 8/2007 | Chatterjee et al. |

FOREIGN PATENT DOCUMENTS

| | | |
|---|---|---|
| WO | WO 2004/042540 A2 | 5/2004 |
| WO | WO 2004/046953 A1 | 6/2004 |
| WO | WO 2005040995 | 5/2005 |

OTHER PUBLICATIONS

TCG, Infrastructure for Trusted Computing, Briefing to ACSAC, Dec. 7, 2004.*

Network Access Control Interoperability Lab, What is TCG TNC? May 2007.*

'Trusted Network Connect' Puts Hardware Security Agent in Every PC; The technology provides hardware-based tools to allow network managers to ensure that PCs comply with security policies; By Andy Dornan, InformationWeek; Feb. 14, 2006.*

Network Access Control Interoperability Lab What is the IETF's NAC Strategy? May 2007.*

Network Access Control Interoperability Lab What is Microsoft Network Access Protection? May 2007.*

InteropLabs Network Access Control Architecture Alphabet Soup, printed out year 2009.*

David Chadwick, The Use of X.509 and E-Healthcare, year 2003.*

Availability Models for Protection Techniques of Transport Network Based on ASON Technology; Hui-sheng Gao; Xiao-dong Yu; Ai-ling Guo; Jing Guo; Wireless Communications, Networking and Mobile Computing, 2008. WiCOM '08. 4th International Conference on; Publication Year: 2008 , pp. 1-4.*

An access control approach for privacy-preserving passive network monitoring; Lioudakis, G.V.; Gogoulos, F.; Antonakopoulou, A.; Mousas, A.S.; Venieris, I.S.; Kaklamani, D.I.; Internet Technology and Secured Transactions, 2009. ICITST 2009. International Conference for; Publication Year: 2009 , pp. 1-8.*

ID-NAC: Identity-based network access control for MANETs; Jourabbaf, N.A.; Movaghar, A.; Networks, 2008. ICON 2008. 16th IEEE International Conference on Publication Year: 2008 , pp. 1-6.*

Microsoft Corporation, Microsoft Windows Server System, Introduction to Network Access Protection, Jun. 2004, pp. 1-13. http://www.microsoft.com/technet/itsolutions/network/nap/napoverview.mspx.

Microsoft Corporation, Microsoft Windows Server System, Network Access Protection Platform Architecture, Jun. 2004, pp. 1-32. http://www.microsoft.com/technet/itsolutions/network/nap/naparch.mspx.

Microsoft Corporation, Microsoft Windows Server System, Internet Protocol Security Quarantine in the Network Access Protection Platform, Jul. 2005, pp. 1-27.http://www.microsoft.com/technet/itsolutions/network/nap/napipsec.mspx.

"AAA: from RADIUS to Diameter," 10 pages (Sep. 18, 2003).

"Cisco Network Admission Control and Microsoft Network Access Protection Interoperability Architecture," *Cisco Systems and Microsoft Corporation*, http://www.cisco.com/en/US/netsol/ns466/networking_solutions_package.html, 8 pages (Published: Sep. 2006).

"Lockdown Networks Unveils Switch-Level Network Access Control," *IT Observer*, http://www.ebcvg.com/press.php?id=1643, 4 pages (Sep. 13, 2005).

"The Cable Guy—Jul. 2005: Network Access Protection Platform Overview," 8 pages (Published: Jun. 29, 2005; Updated: May 23, 2006).

"TPM Work Group," *Trusted Computing Group*, https://www.trustedcomputinggroup.org/groups/tpm/, 1 page (Retrieved Oct. 10, 2006).

Bradner, S., "Key words for use in RFCs to Indicate Requirement Levels,", RFC 2119, http://www.ietf.org/rfc/rfc2119.txt, 3 pages (Mar. 1997).

Chong, F. et al., "Web Service Health Modeling, Instrumentation, and Monitoring: Developing and Using a Web Services Health Model for the Northern Electronics Scenario," http://msdn.microsoft.com/library/en-us/dnbda/html/MSArcSeriesMCS6.asp?frame=true, 36 pages (Sep. 2005).

Cisco Systems, "Cisco Clean Access Manager Installation and Administration Guide," Release 3.5, pp. 1-62 (Jan. 2006).

Cisco Systems, "Cisco Clean Access: In-Band and Out-Of-Band Deployment Options and Considerations," White Paper, pp. 1-8 (2003).

Cisco Systems, "Cisco Clean Access: A Network Admissions Control Appliance," http://www.cisco.com/en/US/products/ps6128/products_data_sheet0900aecd802da1b5.html, 6 pages (Retrieved Sep. 26, 2005).

Cisco Systems, "Securing Complexity with NAC Appliance (Cisco Clean Access): A Technical View," *NAC Appliance Technical Marketing Team*, pp. 1-41 (Jun. 2006).

Conry-Murray, A., "*Cisco NAC* vs. *Microsoft NAP*," http://www.itarchitectmag.com/shared/article/show/Article.jhtml;jsessionid=NFZ3V0ACPV5KQSNDLPCKHSCJUN, 4 pages (Mar. 1, 2005).

Droms, R. et al., "Dynamic Host Configuration Protocol for IPv6 (DHCPv6)," RFC 3315, 100 pages (Jul. 2003).

EP Communication dated May 9, 2006 from EP Application No. 05 103 440.3-2413, 6 pages.

European Search Report mailed Aug. 18, 2005 from EP Application No. 05103440.3-2416 PCT/, 4 pages.

F5 Networks, "Best-In-Class Enterprise SSL VPN," 6 pages (Copyright 2005).

Fidelia Releases Windows Version of its NetVigil™ Real-time Performance Management and Monitoring Suite, http://www.fidelia.com/news/2002/news-win-version.php, 2 pages (Retrieved Nov. 7, 2006).

Hoffman, P., "UTF-16, an encoding of ISO 10646," RFC 2781, http://www.ietf.org/rfc/rfc2781.txt, 14 pages (Feb. 2000).

Jaganathan, K., et al..,"SPNEGO-based Kerberos and NTLM HTTP Authentication in Microsoft Windows," RFC 4559, http://www.ietf.org/rfc/rfc4559.txt, 8 pages (Jun. 2006).

Microsoft Corporation, "Microsoft Windows Server 2003 Network Access Quarantine Control," 35 pages (Published: Mar. 2003; Updated: Oct. 2003).

Microsoft Releases Windows Server 2003 Service Pack 1, http://www.microsoft.com/presspass/press/2005/mar05/03-30winservsplpr.mspx, 4 pages (Retrieved Sep. 26, 2005).

Mockapetris, P., "Domain names—Implementation and Specification," RFC 1035, http://www.ietf.org/rfc/rfc1035.txt, 56 pages (Nov. 1987).

Murphy, T., "The cdma2000 packet core network," *Ericsson Review*, No. 2, pp. 88-95 (2001).

Network Access Protection, Microsoft Corporation, 7 pages (Jun. 25, 2007).

New Trusted Computing Group Formed to Advance the Adoption of Open Standards for Trusted Computing Technologies, https://www.trustedcomputinggroup.org/news/press/tcg/2003/2003_04_08_tcg_formed.pdf, 2 pages (Apr. 8, 2003).

Office Action mailed May 10, 2007 in U.S. Appl. No. 10/823,686.

Office Action mailed Dec. 12, 2007 in U.S. Appl. No. 10/973,970.

Office Action mailed Dec. 12, 2007 in U.S. Appl. No. 11/056,276.

U.S. Appl. No. 11/926,794, filed Oct. 29, 2007.

Pearce, C. et al., "A Protocol for Secrecy and Authentication within Proxy-Based SPKI/SDSI Mobile Networks," *AusCERT 2004 IT Security Conference*, pp. 1-14 (2004).

Persiano, P. et al., "A Secure and Private System for Subscription-Based Remote Services," *ACM Transactions on Information and System Security*, vol. 6, No. 4, pp. 472-500 (Nov. 2003).

Scheifler, R., "X Window System Protocol, Version 11," RFC 1013, pp. 1-101 (Jun. 1987).

Sygate Secure Enterprise, Sygate Technologies, Inc., 4 pages (Copyright 2004).

TCG Trusted Network Connect TNC Architecture for Interoperability Specification Version 1.1, Revision 2, https://www.trustedcomputinggroup.org/specs/TNC/TNC_Architecture_v1_r2.pdf, 40 pages (May 1, 2006).

TCG Trusted Network Connect TNC Architecture for Interoperability Specification Version 1.2, Revision 4, https://www.trustedcomputinggroup.org/specs/TNC/TNC_Architecture_v1_2_r4.pdf, 41 pages (May 21, 2007).

TCG Trusted Network Connect TNC IF-TNCCS Specification Version 1.0, Revision 2, https://www.trustedcomputinggroup.org/specs/TNC/TNC_IF-TNCCS_v1_0_r2.pdf, 21 pages (May 1, 2006).

TCG Trusted Network Connect TNC Architecture for Interoperability Specification Version 1.0, Revision 4, 39 pages (May 3, 2005).

Thompson, J. et al., "A Secure Public Network Access Mechanism," *UNIX Security Symposium III Proceedings*, 13 pages (Sep. 14-16, 1992).

Thurm, S., "Cisco Acts to Take Greater Role in Virus Protection of Networks," *The Wall Street Journal*, 2 pages (Nov. 19, 2003).

White, D. et al., "NAC Solution and Technology Overview," *Cisco Network Admission Control*, vol. II: NAC Deployment and Troubleshooting, 6 pages (Jan. 19, 2007).

Wikipedia, "X Window System," http://en.wikipedia.org/wiki/X_Window_System, pp. 1-15 (Retrieved Mar. 4, 2007).

Zorn, G., "Microsoft Vendor-specific RADIUS Attributes," RFC 2548, pp. 1-37 (Mar. 1999).

Liu, Xiaoyi; Madson, Cheryl; McGrew, David; Nourse, Andrew. "Cisco Systems Simple Certificate Enrollment Protocol (SCEP)," Jan. 2000, [20 pages].

Rutishauser, Ueli; Schafer, Alain. "Open reference implementation of a SCEP v2 client," Mar. 1, 2002, pp. 1-35.

Jansen, Wayne; Karygiannis, Tom; Korolev, Viad; Gavrila, Serban; Iorga, Michaela. "Policy Expression and Enforcement for Handheld Devices," Apr. 2003 , [23 pages].

Thompson, Mary R. et al. "Certificate-Based Authorization Policy in a PKI Environment," ACM Transactions on Information and System Security, Nov. 2003, vol. 6, No. 4, pp. 566-588.

Johnston, William; Mudumbai, Srilekha; Thompson, Mary. "Authorization and Attribute Certificates for Widely Distributed access control," IEEE 7th International Workshops on Enabling Technologies: Infrastructure for Collaborative Enterprises—WETICE '98, Jun. 17-19 1998, pp. 1-6.

Bechler, M. et al. "A Cluster-Based Security Architecture for Ad Hoc Networks," IEEE Infocom 2004, Mar. 7-11, 2004, [11 pages].

"Cryptography", http://msdn.microsoft.com/library/default.asp?url=/library/en-us/seccrypto/security/cryptography_portal.asp.

"Cryptographic Provider Names", http://msdn.microsoft.com/library/default.asp?url=/library/en-us/seccrypto/security/cryptographic_provider_names.asp.

"IPsec", http://www.microsoft.com/technet/itsolutions/network/ipsec/default.mspx.

"Network Access Protection", http://www.microsoft.com/technet/itsolutions/network/nap/default.mspx.

"Windows Resource Protection", http://msdn.microsoft.com/library/default.asp?url=/library/en-us/wfp/setup/windows_file_protection_start_page.asp.

Rigney, C., Willens, S., Rubens, A., and W. Simpson, "Remote Authentication Dial In User Service (RADIUS)", RFC 2865, Jun. 2000, http://www.ietf.org/rfc/rfc2865.txt.

Jonsson, J. and B. Kaliski, "Public-Key Cryptography Standards (PKCS) #1: RSA Cryptography Specifications Version 2.1", RFC 3447, Feb. 2003.

"Trusted Computing Group", https://www.trustedcomputinggroup.org/groups/tpm/.

* cited by examiner

NETWORK ACCESS PROTECTION

BACKGROUND

In computer networks, clients, servers, and peers commonly employ user and machine authentication schemes to determine the identity of network entities or resources requesting an action (e.g., such as access to a part of the network). Such information can in turn be used as input in making authorization decisions based on the identity of the network entity and/or user requesting the action. Therefore, authentication schemes can provide a mechanism by which the identity of network entities and/or users may be used in decision-making processes, such as authorization processes.

BRIEF DESCRIPTION OF DRAWINGS

In the drawings, each identical or nearly identical component that is illustrated in various figures is represented by a like numeral. For purposes of clarity, not every component may be labeled in every drawing. In the drawings.

SUMMARY

Conventional authentication schemes do not incorporate health considerations of resources and entities. As such, although such authentication schemes can protect computer systems from intrusion by unidentified and unauthorized entities, these schemes do not provide any protection against the spread of infectious agents from unhealthy entities. The inventors have appreciated that it may be beneficial to enable health awareness in existing systems in a manner that produces a minimal degree of disruption to pre-existing software and protocols.

The inventors have further appreciated that an approach to health enabling such existing systems can involve augmenting an authentication system to consider the health of a resource and/or user. In various embodiments, an application's pre-existing capabilities for handling assertions (e.g., certificates, such as X. 509 certificates) can be utilized to implicitly verify the health of an entity as part of an authentication process. In some embodiments, an indication of health claims associated with a client can be included in a request for an assertion. Furthermore, an indication of one or more health policies that the client satisfies based on the health claims may be included in an assertion. In some embodiments, such an indication may be included in an extended key usage extension and/or a policy extension field of an assertion.

DETAILED DESCRIPTION

Although conventional authentication schemes incorporate identity information, such conventional schemes do not take into consideration the health of the network entity from which a request originates, also referred to as the requestor. However, the health of the requestor can be an important factor to consider due to the possibility of infectious agents (e.g., viruses, worms, etc.) residing on the requestor. In particular, when an infected requestor communicates with other resources in the network, the infectious agent might spread to the other resources and hence infect the entire network.

As an example, consider how infectious diseases spread in the physical world, and how a single infected individual can ultimately result in millions of infections. To avoid such a situation, infected individuals can be isolated or quarantined from healthy individuals, thereby limiting the spread of the disease. These same techniques can be applied to computer networks, thereby limiting the spread of infectious agents from an unhealthy network resource to healthy network resources.

As previously noted, the consideration of the health of network resources can be used to limit the spread of infectious agents originating from unhealthy network resources. The inventors have appreciated that it may be beneficial to enable health awareness in existing network systems in a manner that produces a minimal degree of disruption to pre-existing software and protocols.

In considering how to incorporate support for health awareness into an existing network system, any extensibility options and design assumptions built into the network system can provide a framework around which health awareness can be integrated. A common design assumption in network systems having authentication systems is that authentication concepts are abstracted into one or more modules responsible for providing an answer regarding whether a session should be allowed.

The inventors have appreciated that an approach to health enabling such existing network systems can involve augmenting such authentication systems to consider the health of a resource and/or user, in addition to identity. Authentication systems can use statements, referred to as assertions (also referred to as claims and/or tickets), to encode information regarding a resource and/or user. In some embodiments, an assertion may be a certificate (e.g., a binding between a private key and one or more attributes), but it should be understood that the invention is not limited in this respect. Specific examples of assertions include, but are not limited to, X.509 certificates and XrML licensees.

In various embodiments, an application's pre-existing capabilities for handling assertions can be utilized to implicitly verify the health of an entity as part of an authentication process. In one embodiment, such an approach can be implemented with X.509 based authentication schemes. Compliance with health policies can be represented in assertions so that a pre-existing authentication system can utilize health policy compliance information and therefore health enablement of pre-existing systems can be achieved with only minimal modifications. As a result, the ability to health enable pre-existing systems, with little to no code modifications, can greatly facilitate the adoption of health aware systems.

In accordance with various embodiments, a method is provided whereby an assertion issuer can express which health policies a principal identified in the assertion was verified to conform with. In some embodiments, the assertion is a X.509 certificate. The X.509 certificate policies extension field can be overloaded to express which health policies the principal was found to conform to. Therefore, the X.509 certificate can serve as both an authentication certificate and a health certificate.

In various embodiments presented, a network may include various components, such as routers, gateways, hubs, network load balancers, etc. and can allow network resources to communicate via wired and/or wireless connections. When interacting with one another over the network, one or more of the resources may act as clients, servers, or peers with respect to other resources. Therefore, various embodiments of the invention may be practiced on clients, servers, peers or combinations thereof, even though specific examples contained herein may not refer to all of these types of network resources or may refer to specific types of such resources.

Figure 1:
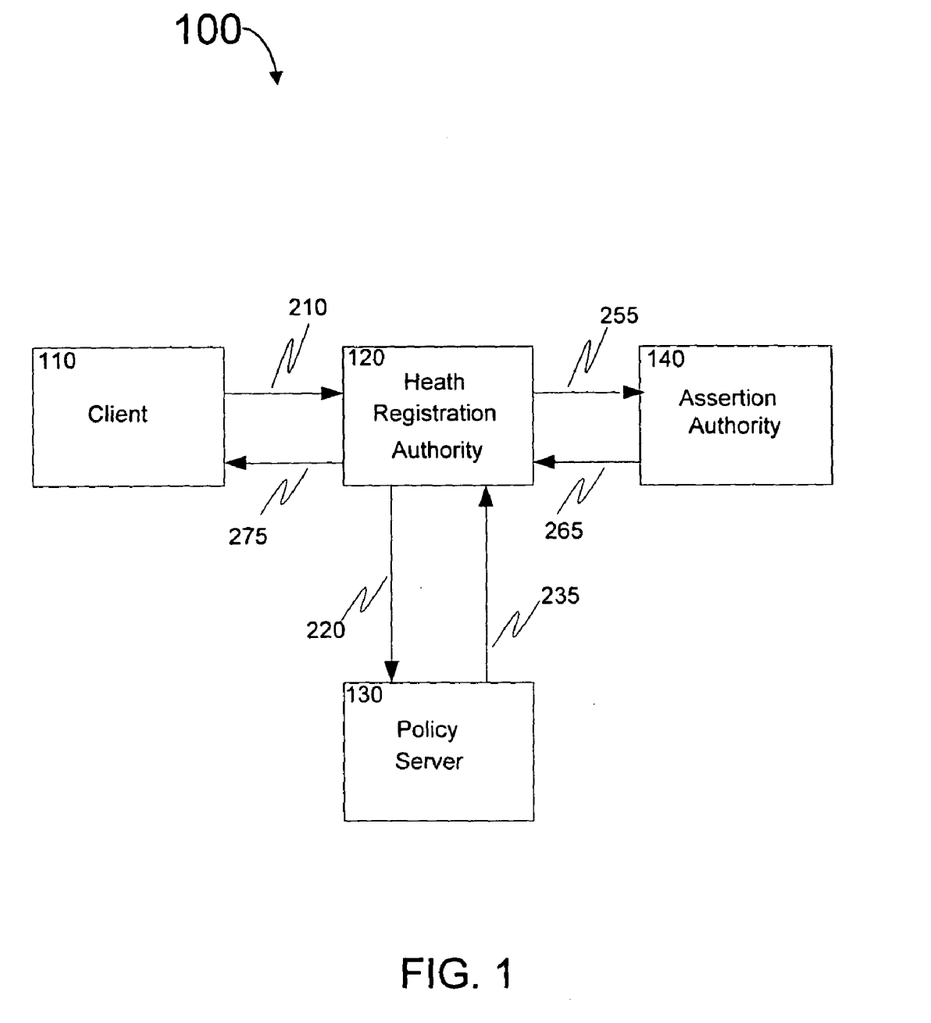
FIG. 1 is a block diagram of a health aware system in accordance with one embodiment.

FIG. 1 is a block diagram of one embodiment of a health aware system 100 including a registration authority (e.g., X.509 registration authority), referred to as a heath registration authority. The system 100 includes a client 110, a health registration authority 120, a policy server 130, and an assertion authority 140. The various components of system 100 may reside on separate physical clients and servers of a network, or one or more of the components may reside on the same machine. For example, in some embodiments, the health registration authority 120, the policy server 130, and the assertion authority 140 can reside on the same server. In other embodiments, the health registration authority 120, the policy server 130, and the assertion authority 140 can reside on different servers. It should be appreciated that various other such deployments are possible, as the invention is not limited in this respect.

The client 110 can be a computer that may be attempting to obtain an assertion which may then be used when accessing one or more resources (not shown) in network 100. In some embodiments, the client 110 may send a request for an assertion to the health registration authority 120. In various embodiments, an up-to-date assertion that has not expired (i.e., been in existence for more than a certain time period) and that reflects the current health state of the client 110 can be maintained by the client 110 so that the assertion is available for use. The up-to-date assertion that is maintained by the client 110 may be accessed by an assertion-enabled network protocol and used when attempting to access network resources that demand an assertion. In other embodiments, the health registration authority 120 (and/or other resources on the network) may monitor attempts by clients to access resources that are configured to accept and verify an assertion prior to granting access to clients. Upon detecting that a client is attempting to access such a resource and that the client does not have an associated assertion, the health registration authority 120 (and/or other resources on the network) may initiate a process to obtain an assertion for the client.

The health registration authority 120 (HRA) may be a network entity responsible for validating statements of health and approving the issuance of assertions. In particular, the HRA 120 may communicate with the policy server 130 and the assertion authority 140 to validate a client's statements of health and approve the issuance of an assertion for the client.

The policy server 130 (PS) may be a network entity responsible for verifying whether the statements of health associated with the client 110 satisfy one or more of the network health policies. Network health policies are policies that clients and other network resources should conform to. Network health policies can include a specification that a client is running a supported operating system version, that operating system patches are installed, that all required software is executing, that a specified anti-virus service is running, that a real time anti-virus protection feature is enabled, that a virus signature database is up-to-date, that a local firewall is executing, and/or that the firewall is configured in accordance with network policy. These are some examples of network health policies, and any other health policy may be defined as desired, as the invention is not limited so.

The assertion authority 140 (AA) may be a network entity responsible for issuing an assertion. The AA 140 need not necessarily be health aware, that is aware of the health state of the client, and may generate an assertion having health claims encoded within specific attributes of the assertion based on a request provided by the HRA 120. As such, the AA 140 need not necessarily be modified to support health awareness, and may enable such support using pre-existing processes for generating assertions.

Figure 2:
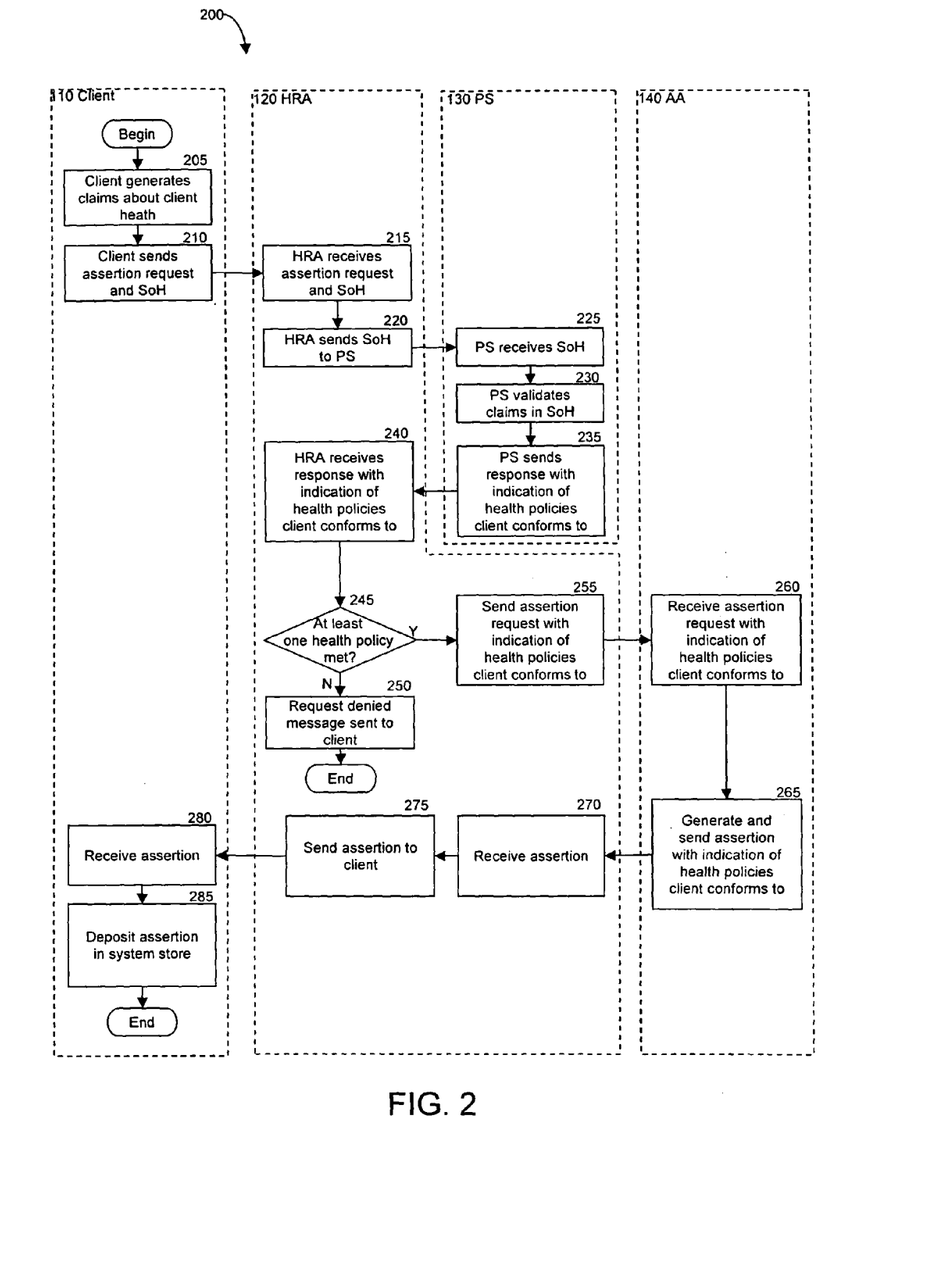
FIG. 2 is a flowchart of a process where a health state of a client is evaluated and an assertion is generated in accordance with one embodiment of the invention.

FIG. 2 is a flowchart for an embodiment of a process by which the health state of a client may be evaluated and an assertion can be generated. Process 200 can be applied to a health aware system, such as, for example, the system 100 of FIG. 1. Such a method can also be applied to other suitable systems and need not be limited to just system 100 of FIG. 1, as the invention is not limited in this respect. In some embodiments, process 200 can be applied at the application level. Process 200 shows various acts being performed by specific network entities, but it should be understood that some of the acts could be performed by other entities, for example applications that can reside on the same machine, as the invention is not limited so.

Process 200 can include act 205 where a client 110 may generate one or more claims about its health state (i.e., health claims), also referred to as a statement of health (SoH). The SoH can include an indication of which operating system version is installed on the client, which operating system patches are installed, the software executing on the client, the anti-virus service running on the client, the enabled anti-virus protection features, the last-update of the virus signature database, whether a local firewall is executing, and/or the configuration of the firewall. These are just some examples of health claims that may be included in the SoH, and any other health claims may be included in the SoH as desired, as the invention is not limited so.

In act 210, the client 110 may generate an assertion request (e.g., a request for an X.509 certificate), bundle the SoH together with the assertion request, and send the assertion request and the SoH to HRA 120. In some embodiments, the assertion request and SoH are sent to the HRA via a protocol referred to as a health certificate enrollment protocol (HCEP), as shall be described further below.

In act 215, HRA 120 receives the client's assertion request and SoH. In act 220, HRA 120 then sends the client's 110 claims about its health state to the PS 130 to determine which, if any, network health policies the client 110 conforms with.

In act 225, the PS 130 receives the claims about the client's health state from HRA 120. The PS 130 can then validate the claims against each of the health policies to determine which health policies the client 110 conforms with (act 230). For each health policy that the client 110 is found to conform with, a corresponding policy identifier is added to a response that can be sent back to the HRA 120 (act 235)

Once HRA 120 receives the response from the PS (act 240), HRA 120 then proceeds to determines whether one or more health policies are satisfied based on the response from the PS 130 (act 245). If no health policies are satisfied by the health state of the client 110, then HRA 120 can proceed to deny the client's 110 request, for example, by sending a message to the client 110 indicating that the assertion request is denied (act 250).

If at least one health policy is met, for each of the health policies that the health state of the client 110 is found to conform with, an indication can be encoded in an assertion request that can be sent to the assertion authority (act 255). In one embodiment, identifiers indicating which health policies the client 110 conforms with may be encoded in an extended key usage extension in an assertion request, and/or in any policy extension field, or in any other suitable manner. If the identity of the client 110 is known, the assertion request that is forwarded to the AA 140 can also include an indication of the identity of the client 110, but this need not necessarily be so, as may be the case for an anonymous assertion.

AA 140 can receive the assertion request from HRA 120 (act 260), and in response, generate and send back an assertion (e.g., a X.509 certificate) to HRA 120 (act 265). Since AA 140 need not necessarily be health aware, AA 140 may generate the assertion containing encoded conforming health policy information without any awareness of the meaning of the encoded health information. For example, if the health policies information is encoded in the policies extension field in an assertion request, AA 140 can generate the assertion without necessarily deciphering the meaning of the encoded health policies information. As such, AA 140 may function as it regularly would when processing an assertion request without any encoded health policies information. Therefore, the AA 140 need not necessarily be modified to enable health awareness. Furthermore, the assertion generated by AA 140 can have the same format as an assertion without explicit health policy fields, and yet still serve to convey health information due to the encoded health policy information, for example, health information encoded in the policies extension field of the assertion.

HRA 120 can receive the assertion from the AA (act 270) and can send the assertion to client 110 (act 275). Client 110 can receive the assertion from HRA 120 (act 280) and can deposit the assertion into a system store (act 285). The system store can store assertions for the client 110, such that when an assertion aware application (e.g., an X.509 aware application) attempts to find an assertion, for example, to verify the identity and/or health of the client, the aforementioned assertion can be selected.

The abovementioned system and process allows an operator who is managing a server or application, requiring a client's health information, to state that a client have an assertion that satisfies desired health policies. Therefore, the method enables the server or application to request that a client is healthy, according to the desired health policies, before allowing authentication, thereby facilitating network access protection.

It should be appreciated that the components of the abovementioned health aware system can be implemented in a number of various implementations. For example, as previously mentioned, the system can be implemented at a network and/or application level, as the invention is not limited in this respect. Specific implementations of the components shall be presented below, but it should be understood that various modifications are possible.

Figure 3:
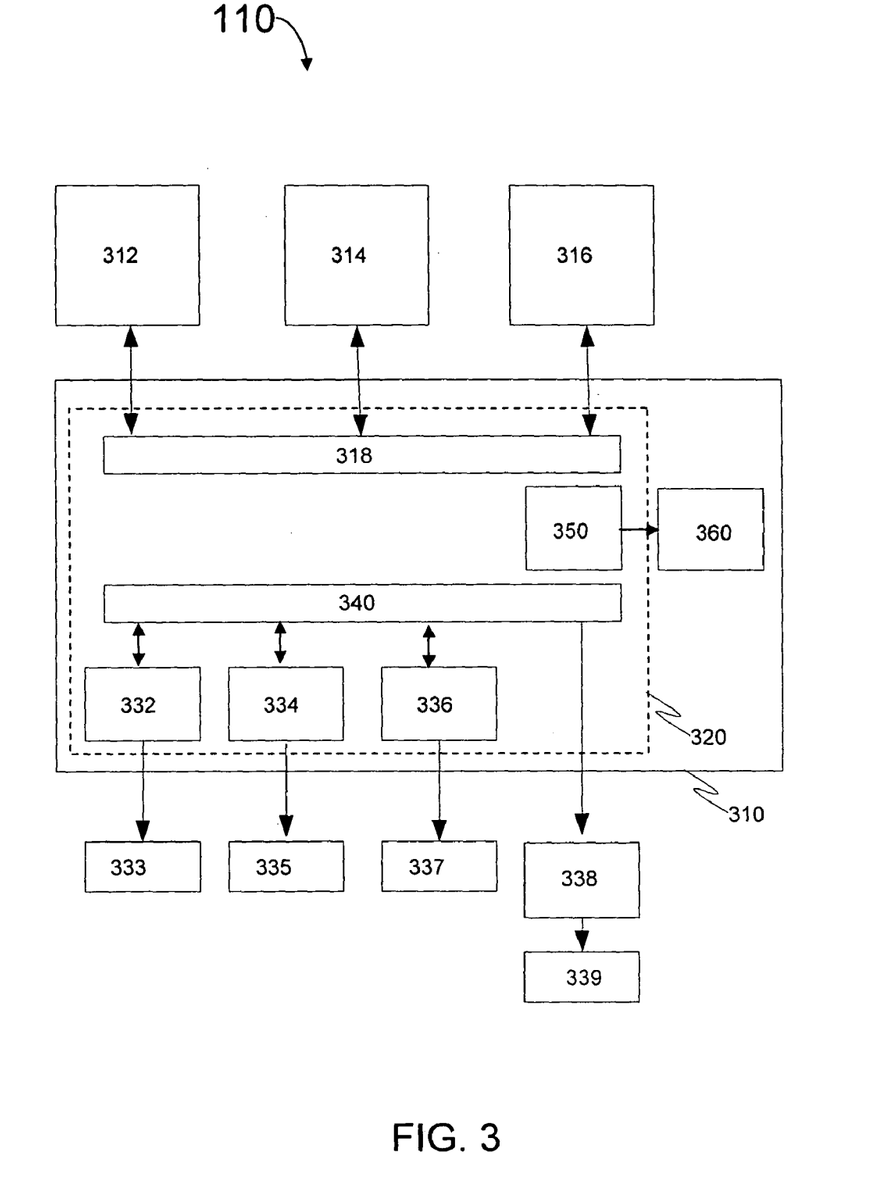
FIG. 3 is a block diagram of client components that can enable health awareness in accordance with one embodiment of the invention.

FIG. 3 is a block diagram of an embodiment of a client 110 that includes components that can enable health awareness. Client 110 includes a quarantine service 310 that can communicate with one or more system health agents (SHAs) 312, 314, and 316.

SHAs 312, 314, and 316 can make determinations and declarations (i.e., SoH) about one or more aspects of the client's 110 health. For example, one of the SHAs may determine what antivirus signatures are installed, another one of the SHAs may determine whether an antivirus security program is running, and yet another one of the SHAs may determine what operating system updates are installed. It should be appreciated that these are merely examples of some types of SHAs, and that the invention is not limited to just the above-mentioned examples. Furthermore, it should also be appreciated that third-parties can supply SHAs so that any desired statement of health about the client can be generated. In the embodiment illustrated in FIG. 3, the SHAs 312, 314, and 316 are not part of the quarantine service 310, but rather can communicate to the quarantine server via suitable communication methods. For example, the SHAs 312, 314, and 316 can use COM APIs to communicate with the quarantine service 310, although other communication techniques could alternatively, or additionally, be used to achieve the communication.

Quarantine service 310 can include a quarantine agent 320 that can aggregate and maintain health statements collected from SHAs 312, 314, and 316. In the embodiment of FIG. 3, the quarantine agent 320 can also include a SHA application programming interface (API) 318 that can be responsible for allowing access to the SHAs 312, 314, and 316.

SHA API 318 can enable the SHAs 312, 314, and 316 to trigger a re-evaluation of the client's 110 overall health. The SHA API 318 can also provide a mechanism for the quarantine agent 320 to query a specific SHA 312, 314, or 316 for an evaluation of the client's 110 health based on that specific SHA's health evaluation query (e.g., antivirus running, firewall running, updated operating system, etc.).

Quarantine agent 320 can also include one or more quarantine enforcement clients (QECs) 332, 334, and 336 that can facilitate enforcement of access to specific health aware applications and/or communication protocols 333, 335, and 337. Examples of protocols can include DHCP, RRAS, IPSEC, and 802.1x. Different types of resources and protocols may each have an associated QEC that is responsible for facilitating enforcement for access to that specific resource or protocol. QECs 332, 334, and 336 need not necessarily reside within the quarantine agent 320, and can execute out-of-process, thereby facilitating the incorporation of third party QECs and protocols, such as QEC 338 and protocol 339. QECs 332, 334, 336 and 338 can be accessed via a QEC API 340, which can function in a manner similar to SHA API 318, and therefore can allow for the query and notification of any state change.

The quarantine agent 320 can also include a health certificate enrollment agent (HCEA) 350 which can communicate with a health key and certificate management service (HKCMS) 360. In other embodiments, the HCEA 350 can reside external to the quarantine agent 310, as the invention is not limited in this respect. In the embodiment illustrated in FIG. 3, the quarantine service 310 includes the HKCMS 360, but it should be appreciated that other arrangements are possible. For instance, the HKCMS can be part of the HCEA, and therefore may have the same level of access privileges as the HCEA. In contrast, in the illustrated embodiment, by not incorporating the HKCMS 360 within the HCEA 350, each component can be assigned a minimum level of access privileges, which can in turn provide enhanced security.

Figure 4:
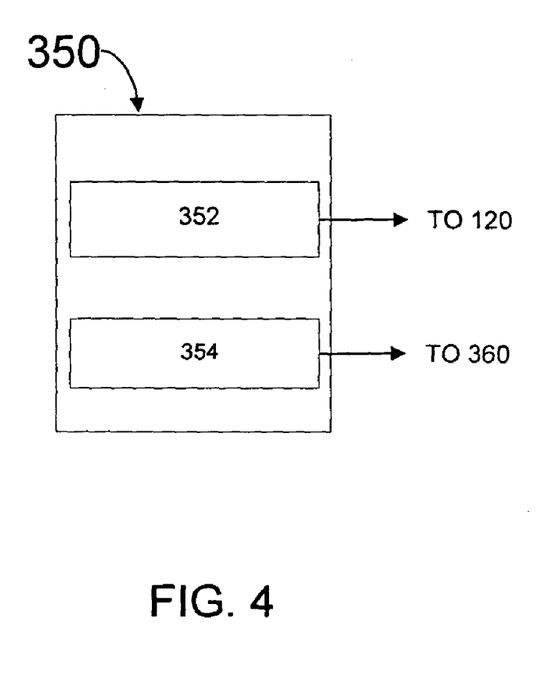
FIG. 4 is a block diagram of a health certificate enrolment agent in accordance with one embodiment of the invention.

FIG. 4 is a block diagram of an embodiment of HCEA 350 executing on a client, for example, client 110 of FIG. 3. HCEA 350 can be responsible for communication with HRA 120 via a health certificate request protocol 352, determining whether the HRA 120 is trusted, implementing the health certificate request protocol for communication with the HRA 120, populating the fields of a certificate request to be sent to the HRA 120, maintaining certificates for HCEA subscribers, and communicating with the HKCMS 360.

The HCEA 350 can communicate with the HKCMS 360 so as to generate keys (e.g., asymmetric or symmetric keys) to be associated with a certificate request, sign the certificate request, delete certificates that may no longer be valid (e.g., as a result of no subscription or certificate expiration), install any issued certificate, and/or associate any meta-data with the certificate. Potential situations where a certificate may be expired can include instances where the health state of the client, for which the certificate was acquired, has changed, for example, as in when a formerly activated firewall is disabled. In the illustrated embodiment of FIG. 4, the HCEA 350 can communicate with the HKCMS 360 via a certificate enrollment process 354.

Figure 5:
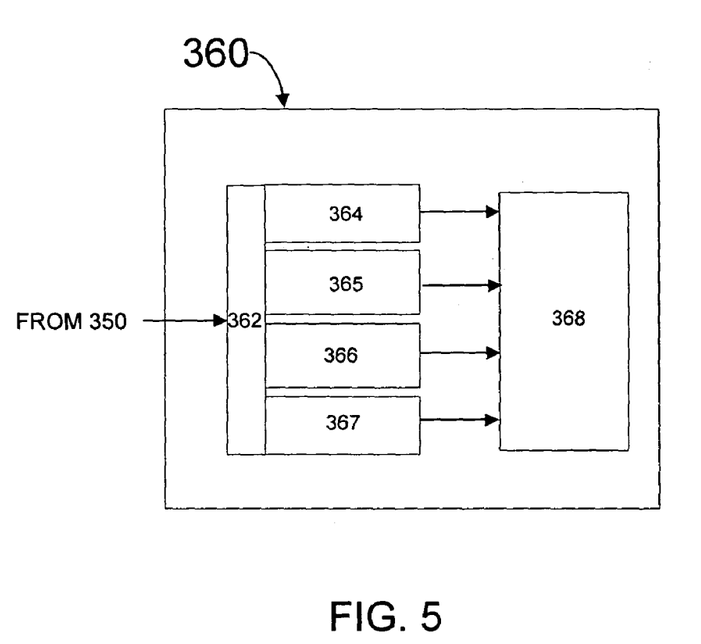
FIG. 5 is a block diagram of an embodiment of an health key and certificate management service in accordance with one embodiment of the invention.

FIG. 5 is a block diagram of an embodiment of a HKCMS 360 that HCEA 350 can communicate with. HKCMS 360 can be a demand start service that can execute when called. HKCMS 360 can include exposed APIs 362 that allow for a caller (e.g., HCEA 350) to generate keys, generate certificate requests, perform certificate addition, enroll certificates, and/or perform other certificate management tasks. The HKCMS 360 may comprise components which may be accessed via API 362 and that facilitate key generation (component 364), certificate request generation (component 365), certificate addition (component 366), and certificate enrollment (component 367). In the illustrated embodiment, components 364, 365, 366, and 367 can in turn call APIs 368 that enable the use of services that can facilitate cryptography, cryptographic key management, and certificate management.

Figure 6:
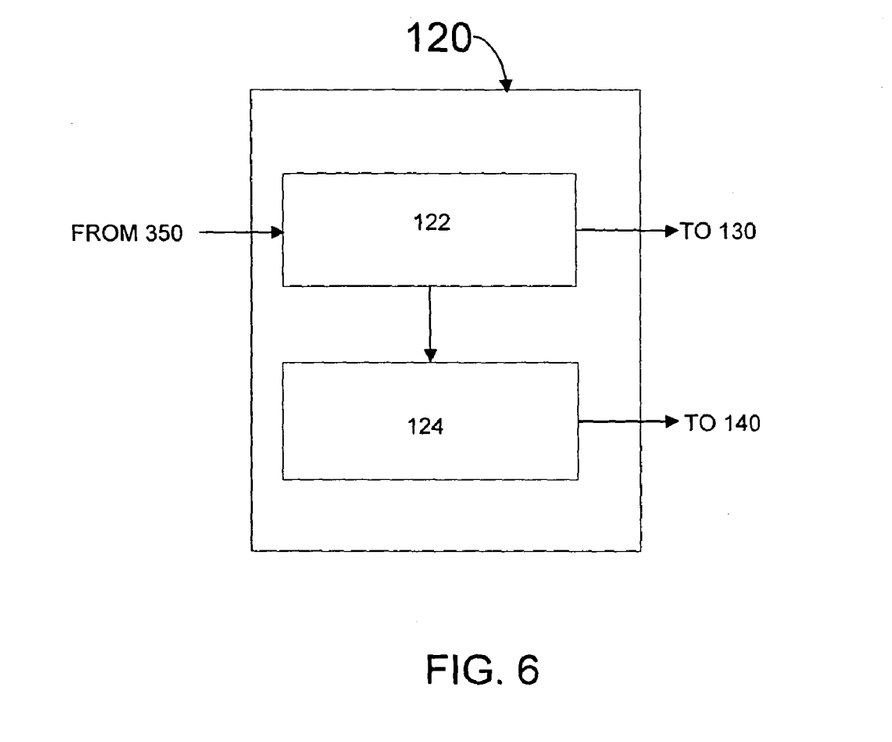
FIG. 6 is a flow chart of a health certificate enrolment protocol in accordance with one embodiment of the invention.

FIG. 6 is a block diagram of an embodiment of HRA 120 of FIG. 1. HRA 120 can include two core components, 122 and 124, that can facilitate communication with the PS 130 and the AA 140, respectively. The first component 122 may be responsible for forwarding the SoH from the client (e.g., sent by HCEA 350) to the PS 130, and the second component 124 can facilitate interactions with the AA 140. Component 122 may interact with component 124 so as to initiate the generation of a certificate based on a response sent by PS 130. It should also be appreciated that other implementations of the HRA 120 are possible, for example, the first and second components 122 and 124 may be combined into a single component, as the invention is not limited in this respect.

As previously mentioned, HRA 120 may be a component responsible for validating the client's SoH (e.g., sent via HCEA 350) and approving the issuance of a health certificate. The HRA 120 can perform the functions of a registration authority, and therefore, HRA 120 may be responsible for the validation of a certificate request and a SoH supplied by the client 110 and for ensuring that the SoH conforms with health policies before forwarding the request to the AA 140 for processing.

When a certificate request is received by HRA 120, the HRA 120 can validate the request via a combination of internal processing and/or communication with PS 130. If the request is found to be valid and the client's health satisfies at least one health policy, the certificate request may be forwarded to the AA 140 to be processed, and an issued certificate may be returned to the client 110 for later use.

Specifically, when a certificate request is received by HRA 120, the HRA 120 may determine whether the client 110 meets some base policies before proceeding with the certificate issuance process. A base policy may be that the certificate request was signed by a private key associated with a public key that is represented in the certificate request. Another base policy may be that the request was authenticated, the name in the certificate request matches that of the principal that was authenticated, and if this and the other base policies are satisfied, the name should be included in the resulting certificate. Another base policy may be that the HRA's authentication policy is being honored, wherein the authentication policy may be that when the request contains the name of the client, the HRA verifies that the name of the requestor was authenticated to be the same principal (e.g., by the Internet Information Service). If not, the request may still be processed, but a certificate may instead be issued as an anonymous certificate, rather than an authenticated certificate.

Another base policy may be that the HRA's cryptographic policy is honored. Specifically, the HRA's cryptographic policy may include that the certificate request contains a public key for an allowed asymmetric key algorithm (e.g., RSA, DSA, etc.), have a key length between the minimum and maximum allowed key lengths for that algorithm, have keys generated with an allowed cryptographic service provider (if a cryptographic service provider is used in the embodiment), and/or have a signature generated using an allowed algorithm.

Once the HRA 120 has validated the abovementioned aspects of the certificate request, the HRA 120 may create a new certificate request and copy the desired (and validated) attributes from the incoming request into the newly created request (e.g., machine name, public key, etc.). Such a process can prevent a client from being able to use the HRA 120 as a channel to receive a certificate containing arbitrary, non-validated extensions in the certificate.

Before submitting the request to the AA 140 for processing, the HRA 120 may also verify with the PS 130 that the SoH supplied by the client satisfy one or more health policies. When PS 130 indicates that the client is conformant with at least one health policy, a certificate request may be forwarded to the AA 140 for processing.

When the HRA 120 receives a certificate back from the AA 140, HRA 120 may also determine if the issued certificate is approaching expiration as defined by HRA 120 policy. If so, an event log warning may be created by HRA 120. After the abovementioned processing, the issued certificate may be forwarded to the client 110.

Figure 7:
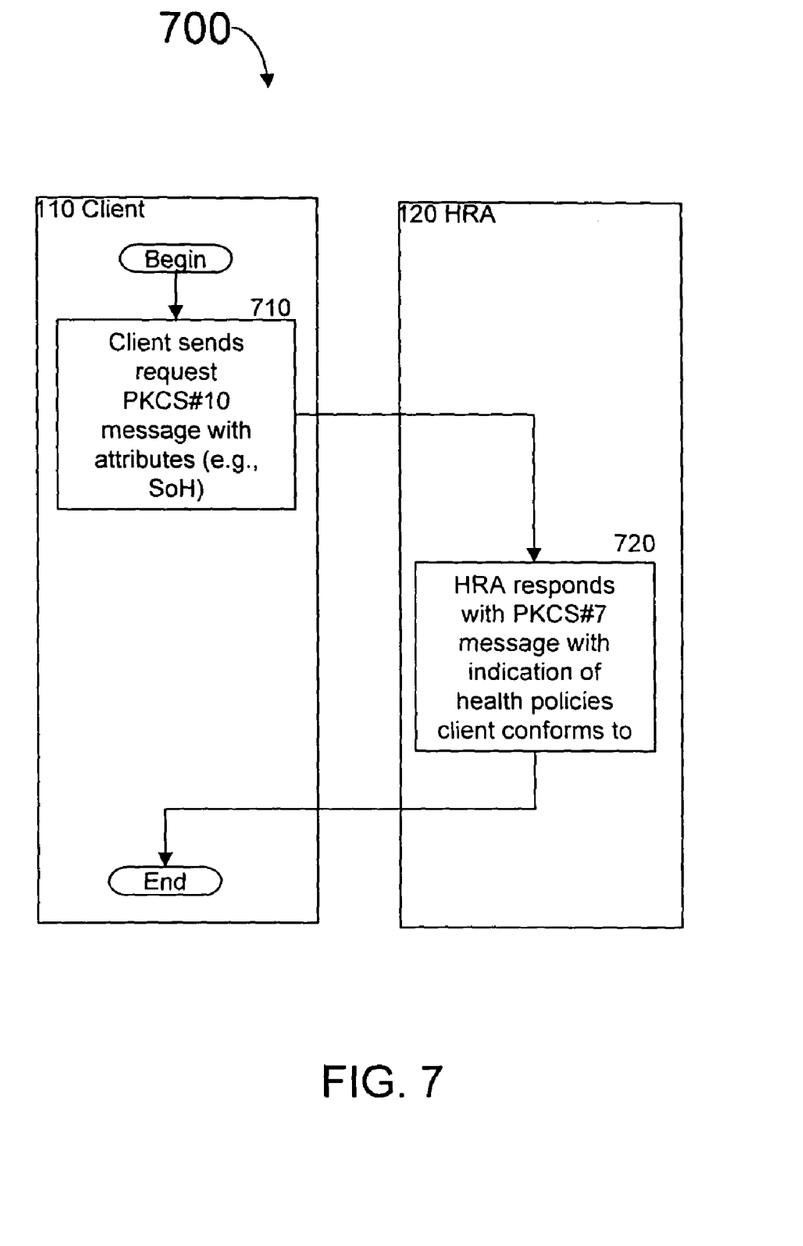
FIG. 7 is a flow chart of a health certification enrolment protocol in accordance with another embodiment of the invention.

FIG. 7 is a flow chart for an embodiment of a health certificate enrolment protocol (HCEP) 700 that can enable communication between client 110 (e.g., via quarantine agent 320) and HRA 120. In some embodiments, the HCEP uses a non-encrypted transport protocol, such as an HTTP based protocol. In other embodiments, the HCEP uses a transport protocol that can incorporate at least some encryption to facilitate some security, such as a TLS or SSL based protocol.

HCEP 700 may include the generation and transmission (to the HRA 120) of a certificate request as a PKCS#10 message (as defined by the Public Key Cryptography Standards devised and published by RSA laboratories in California) including elements which the HRA 120 may use to validate certificate requests (act 710).

The request may be sent via HTTP and in some embodiments may not be cached, hence the request may be labeled as such. The request may be a PKCS#10 message that may be encoded for size reasons, for example, using Distinguished Encoding Rules or another other suitable encoding rules. The PKCS#10 message may be used as a health certificate request message and may be formatted to include a subject field containing the client's requested distinguished name, a public key information field containing a signature that includes information about the public key being certified, and attribute fields that contain a collection of attributes that provide additional information about the subject of the certificate.

Requests can include a number of attributes which may not be authenticated and may be placed as HTTP header values. Examples include the version of the HCEP protocol being used and a unique identifier used by the HCEA to determine which transaction a HCEP request is associated with.

The request's attributes for which authentication is desired may be represented as custom PKCS#9 attributes. Such attributes can include the client's SoH, an indication of a cryptographic service provider (CSP) used to generate the key pair (in embodiments where a CSP is used), a key container for the CSP that contains the corresponding private key, and a "keyspec" (i.e., slot in the key container) for the corresponding private key. The request may also include a PKCS#9 "extension request" indication if the client may be requesting that extensions be included in the resulting certificate. The final request may be signed using the private key corresponding to the public key represented in the public key information field of the request.

HCEP 700 may include a response (act 720) from the HRA 120, which in the success case may be a standard Type-Length-Value (TLV) including a PKCS#7 message that contains the certificate. Meta-data associated with the health certification of the client can be included as attributes of the certificate. One such meta-data may include an encoded (e.g., BASE64) indication of which health policies the principal identified in the certificate was verified to conform with. In this way, health state information about the client may be stored in a certificate which may not necessarily have been designed to store health-related information.

As should be appreciated from the foregoing, there are numerous aspects of the present invention described herein that can be used independently of one another, including the aspects that relate to including health-related information in a request for an assertion and a resulting assertion, enabling health awareness for applications and resources, and enabling communication between a client and a HRA.

However, it should also be appreciated that in some embodiments, all of the above-described features can be used together, or any combination or subset of the features described above can be employed together in a particular implementation, as the aspects of the present invention are not limited in this respect The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, it should be appreciated that one embodiment of the invention is directed to a computer-readable medium or multiple computer-readable media (e.g., a computer memory, one or more floppy disks, compact disks, optical disks, magnetic tapes, etc.) encoded with one or more programs that, when executed, on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing, and the aspects of the present invention described herein are not limited in their application to the details and arrangements of components set forth in the foregoing description or illustrated in the drawings. The aspects of the invention are capable of other embodiments and of being practiced or of being carried out in various ways. Various aspects of the present invention may be implemented in connection with any type of network, cluster or configuration. No limitations are placed on the network implementation.

Accordingly, the foregoing description and drawings are by way of example only.

Also, the phraseology and terminology used herein is for the purpose of description and should not be regarded as limiting. The use of "including," "comprising," or "having," "containing," "involving," and variations thereof herein, is meant to encompass the items listed thereafter and equivalent thereof as well as additional items.

What is claimed:

1. A method for use in a computer system comprising a client and a health registration authority, the health registration authority being configured to accept requests for assertions, the client having a health state described by at least one health claim, the method comprising:

(A) generating, by a processor executing code stored on a computer-readable medium, an indication of the at least one health claim of the client in a request for an assertion; and (B) generating, by the processor executing code stored on the computer-readable medium, an indication of at least one health policy that the at least one health claim of the client satisfies in a policy extension field of an X.509 certificate sent with a second request for an assertion.

2. The method of claim 1, further comprising an act of:

(B) sending the request for the assertion, created in act (A), to the health registration authority.

3. The method of claim 2, wherein the computer system further comprises a plurality of health policies, and wherein the method further comprises acts of:

(C) receiving the request for the assertion sent in act (B); and (D) after act (C), determining at least one health policy of the plurality of health policies that the at least one health claim of the client satisfies.

4. A method for use in a computer system comprising a client and an assertion authority, the assertion authority configured to generate assertions associated with the client, the client having a health state described by at least one health claim, the computer system further comprising a plurality of health policies, the health claim of the client satisfying at least one health policy of the plurality of policies, the method comprising:

(A) generating, by a processor executing code stored on a computer-readable medium, an indication of the at least one health policy that the health claim of the client satisfies in an assertion; and (B) generating, by the processor executing code stored on the computer-readable medium, an indication of at least one health policy that the at least one health claim of the client satisfies in a policy extension field of an X.509 certificate sent with a second request for an assertion.

5. At least one computer for use with a computer system comprising a client having a health state described by at least one health claim, the computer system further comprising a plurality of health policies, the health claim of the client satisfying at least one health policy of the plurality of policies, the at least one computer comprising at least one processor programmed to:

generate, by executing code stored on a computer-readable medium, an indication of the at least one health policy that the at least one health claim of the client satisfies in a request for an assertion; and generate, by executing code stored on the computer-readable medium, an indication of at least one health policy that the at least one health claim of the client satisfies in a policy extension field of an X.509 certificate sent with a second request for an assertion.

* * * * *